US012011846B2

(12) United States Patent
Tezza, II et al.

(10) Patent No.: US 12,011,846 B2
(45) Date of Patent: Jun. 18, 2024

(54) EASY TO ASSEMBLE CABINETS WITH CURVED CORNERS

(71) Applicants: Peter J. Tezza, II, Oxnard, CA (US); Jean-Thierry Aupetit, Oxnard, CA (US)

(72) Inventors: Peter J. Tezza, II, Oxnard, CA (US); Jean-Thierry Aupetit, Oxnard, CA (US)

( * ) Notice: Subject to any disclaimer, the term of this patent is extended or adjusted under 35 U.S.C. 154(b) by 30 days.

(21) Appl. No.: 17/851,011

(22) Filed: Jun. 27, 2022

(65) Prior Publication Data

US 2022/0410426 A1 Dec. 29, 2022

Related U.S. Application Data

(60) Provisional application No. 63/215,905, filed on Jun. 28, 2021.

(51) Int. Cl.
*B27M 3/18* (2006.01)
*B27C 3/02* (2006.01)
*B27M 3/34* (2006.01)

(52) U.S. Cl.
CPC ................. *B27M 3/34* (2013.01); *B27C 3/02* (2013.01); *B27M 3/18* (2013.01)

(58) Field of Classification Search
CPC .................................. B27M 3/18; B27M 3/34
See application file for complete search history.

(56) References Cited

U.S. PATENT DOCUMENTS

| | | | | | |
|---|---|---|---|---|---|
| 1,346,161 | A * | 7/1920 | Basquin | B27D 1/08 | 144/380 |
| 2,134,999 | A * | 11/1938 | Crouch | B27G 5/00 | 144/381 |
| 2,890,731 | A * | 6/1959 | Maffei | F16B 12/04 | 144/381 |
| 6,089,288 | A * | 7/2000 | Crowe | B27D 1/08 | 144/380 |
| 2005/0240300 | A1* | 10/2005 | Sigtryggsson | B27M 1/08 | 700/171 |
| 2015/0284963 | A1* | 10/2015 | Fisher | B61D 17/18 | 52/287.1 |
| 2019/0032343 | A1* | 1/2019 | Decruy | E04F 19/062 | |

* cited by examiner

*Primary Examiner* — Bobby Yeonjin Kim
*Assistant Examiner* — Jared O Brown
(74) *Attorney, Agent, or Firm* — David Michie

(57) ABSTRACT

A method for constructing and assembling a curved cabinet for a vehicle, the method comprising: using a computer numerical controlled (CNC) router on a sheet of wood; wherein the CNC router cuts out from the sheet at least one of: skins; skeleton structures; and accessory parts; fastening at least two of the skeleton structures together to create a fastened skeleton structure; heating with heat lamps and steam tubes at least one of the skins about at least one bend groove; bending the skin about the at least one bend groove to conform with the fastened skeleton structure to create a curved portion; clamping the skin and the fastened skeleton structure together near the curved portion; wherein the clamped skin and skeleton structure are fastened together with a second set of fasteners to create an imperfected cabinet; attaching the accessory parts to the imperfected cabinet to create the curved cabinet.

6 Claims, 4 Drawing Sheets

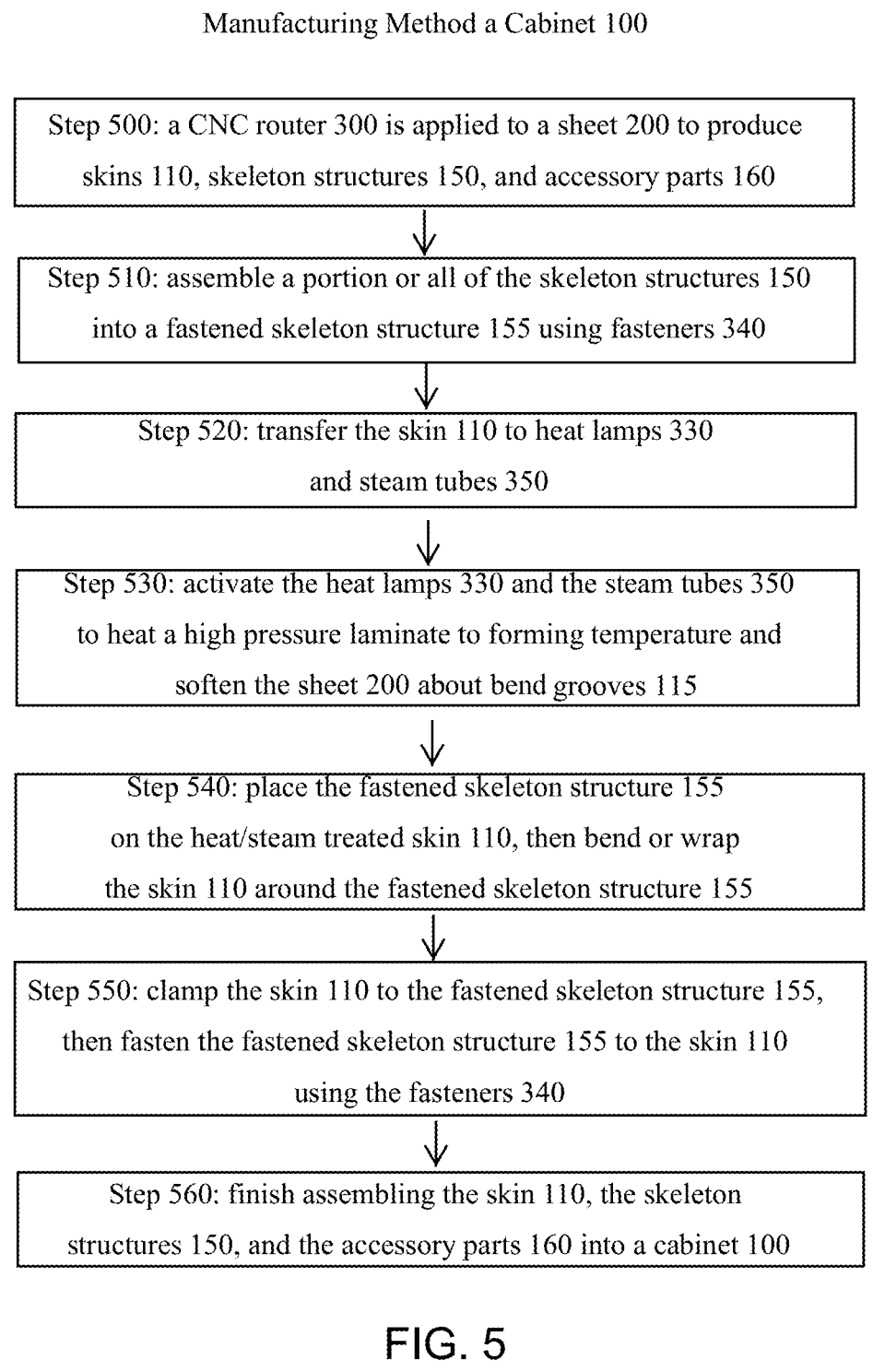

Manufacturing Method a Cabinet 100

Step 500: a CNC router 300 is applied to a sheet 200 to produce skins 110, skeleton structures 150, and accessory parts 160

↓

Step 510: assemble a portion or all of the skeleton structures 150 into a fastened skeleton structure 155 using fasteners 340

↓

Step 520: transfer the skin 110 to heat lamps 330 and steam tubes 350

↓

Step 530: activate the heat lamps 330 and the steam tubes 350 to heat a high pressure laminate to forming temperature and soften the sheet 200 about bend grooves 115

↓

Step 540: place the fastened skeleton structure 155 on the heat/steam treated skin 110, then bend or wrap the skin 110 around the fastened skeleton structure 155

↓

Step 550: clamp the skin 110 to the fastened skeleton structure 155, then fasten the fastened skeleton structure 155 to the skin 110 using the fasteners 340

↓

Step 560: finish assembling the skin 110, the skeleton structures 150, and the accessory parts 160 into a cabinet 100

FIG. 5

EASY TO ASSEMBLE CABINETS WITH CURVED CORNERS

CROSS-REFERENCE TO RELATED APPLICATIONS

This application is a non-provisional of, and claims the benefit of priority from, U.S. Provisional Patent Application No. 63/215,905 filed Jun. 28, 2021.

FEDERALLY SPONSORED REASEARCH

Not Applicable

FIELD OF INVENTION

This invention relates to manufacturing cabinets for a vehicle, more particularly, to manufacturing cabinets for vehicles such as vans, camper vans, and recreational vehicles (RVs).

BACKGROUND

Current cabinets for vehicles are blocky permanent structures that are fragile and cannot be readily removed. These cabinets tend to be heavy and add to the overall vehicle weight, thus placing additional wear and tear on the motor of the vehicle. Often, these cabinets require professional installation and/or removal to prevent damage to other structures in the vehicle.

Other drawbacks are that such cabinets produce a large amount of waste when they are constructed, and they require expensive, specialized equipment to assemble, such as CNC routers, clamps or clamp machines, edge banders, CNCs for drilling and installing dowls. Constructing cabinets for vehicles requires an extensive amount of time for glue to dry, require finishing with paints, stains, and protective coatings, which also takes additional time. Finally, such cabinets need additional time to create curved corners using previous forms or joining techniques.

There is a need for cabinets for modular installations in vehicles that require strong and lightweight characteristics. Additionally, these cabinets would need to be more aesthetically pleasing using curved corners, which could also reduce sharp corners and resulting injuries. These cabinets should be assembled with basic tools and skills, thus reducing costs as a result of errors and manufacturing time.

BRIEF SUMMARY OF THE INVENTION

A method for constructing and assembling a curved cabinet for a vehicle, the method comprising: using a computer numerical controlled (CNC) router on a sheet of wood; wherein the sheet of wood may have at least one side of high pressurized laminate; wherein the CNC router cuts out from the sheet at least one of: skins; skeleton structures; and accessory parts; fastening with a power drill and a first set of fasteners at least two of the skeleton structures together to create a fastened skeleton structure; heating with heat lamps and steam tubes at least one of the skins about at least one bend groove; wherein the at least one bend groove is cut using the CNC router; placing the fastened skeleton structure on one of the skins; bending the skin about the at least one bend groove to conform with the fastened skeleton structure to create a curved portion; clamping the skin and the fastened skeleton structure together near the curved portion; wherein the clamped skin and skeleton structure are fastened together with a second set of fasteners to create an imperfected cabinet; attaching the accessory parts to the imperfected cabinet to create the curved cabinet.

Wherein the CNC router cuts at least one of indexes, grooves, and notches into each of the skins, the skeleton structure, and the accessory parts; wherein the at least one of indexes, grooves, and notches improve assembly of the curved cabinet.

BRIEF DESCRIPTION OF THE DRAWINGS

FIG. 5 is a method flow chart for manufacturing a curved cabinet.

DETAILED DESCRIPTION OF THE INVENTION

Figure 1A:
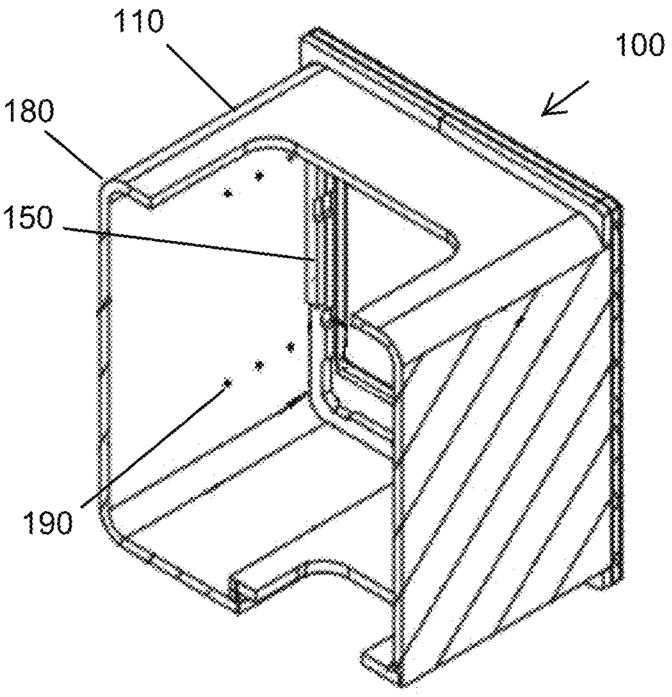
FIG. 1A is an isometric view of a curved cabinet.
Figure 1B:
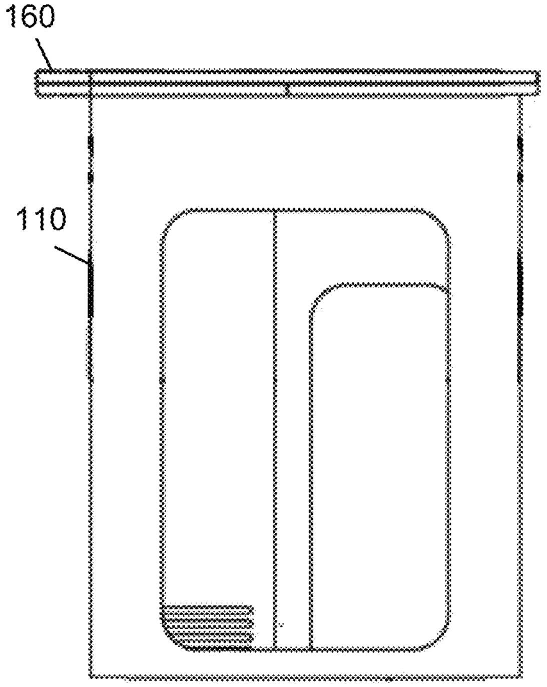
FIG. 1B is a front view of the curved cabinet.
Figure 1C:
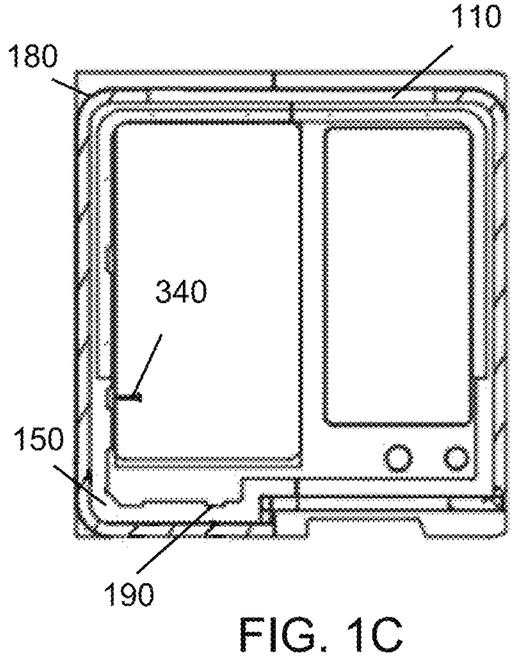
FIG. 1C is a cross section view of the curved cabinet of FIG. 1B showing a skeleton structure.
Figure 2:
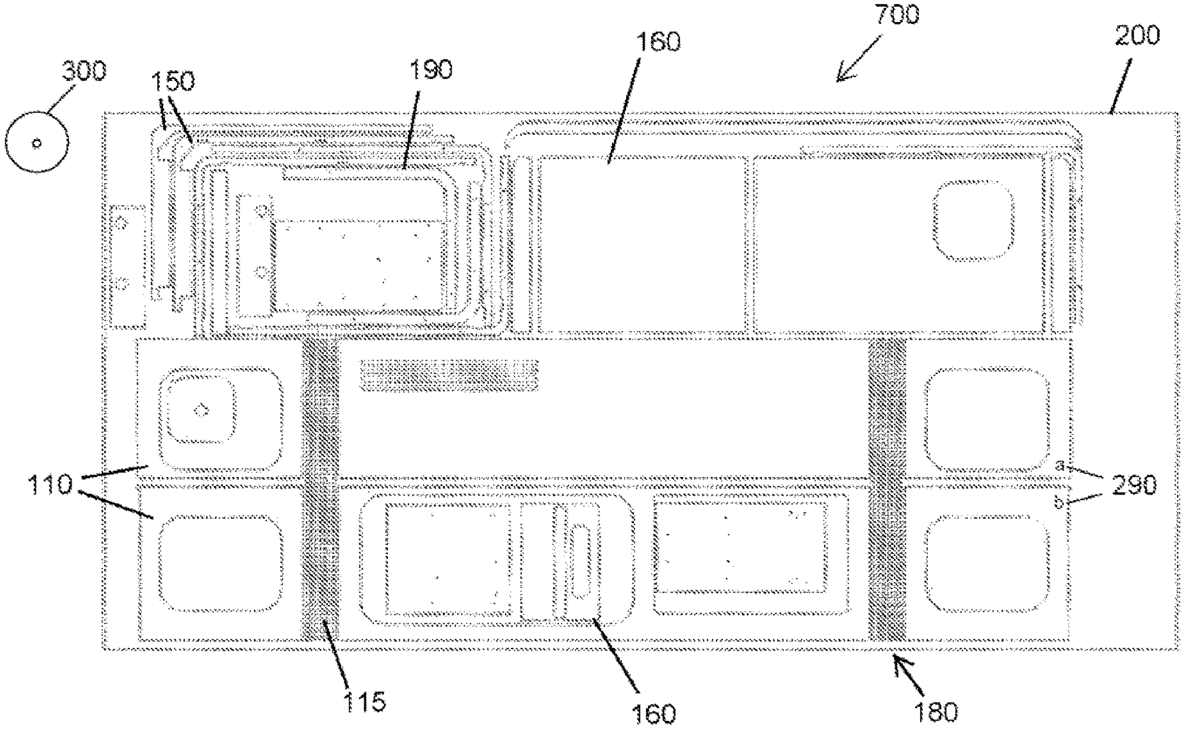
FIG. 2 is a top view of a sheet with nested parts, including skins, skeleton structures, and accessory parts.
Figure 3:
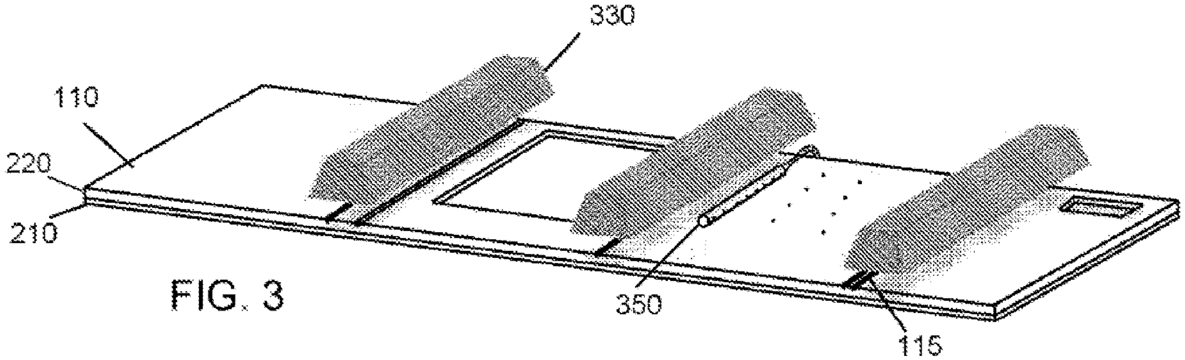
FIG. 3 is an isometric view of heat lamps applying heat to a skin.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this application will be thorough and complete, and will fully convey the true scope of the invention to those skilled in the art.

In most embodiments, as seen in FIGS. 1-4, a cabinet 100 may be manufactured from a sheet 200 for use in a structure or vehicle 4-0 (not shown). In a preferred embodiment, the sheet 200 may be a sheet of wood 220 (not shown). In this preferred embodiment, the sheet 200 made from wood 220 may have the structural and aesthetic characteristics such as lightweight, strong, durable, and visual pleasing attributes to benefit the cabinet 100 installed in the vehicle 4-0% In other embodiments, the sheet 200 may be any material capable of being machined by a CNC router and bendable using heat with light weight properties.

The cabinet 100 may be light and strong from the use of lightweight materials combined with an airplane style skin 110, skeleton structures 150, and accessory parts 160 design that may allow for curved portions 180. The skin 110 may act as the outer shell of the cabinet 100. The skeleton structures 150 may act as an essential frame of the cabinet 100. And, the accessory parts 160 may comprise of drawers, doors, countertops, shelves, etc. of the cabinet 100 depending on a design of the cabinet 100. The curved portions 180 may become corners for the cabinet 100. In most embodiments, a radius of the curved portion 180 may depend on a spacing, size, and number of bending grooves 115 cut into the skins 110. In some embodiments, the skins 110, the skeleton structures 150, and accessory parts 160 may overlap so as to increase thickness and structural integrity. In most embodiments, all parts (110, 150, 160) of the cabinet 100 may be cut from a single sheet 200.

In these embodiments, the skins 110 and the skeleton structures 150 may be designed on the single sheet 200. In most embodiments, the skins 110, the skeleton structures 150, and the accessory parts 160 may be nested on the sheet 200. This allows for a highly efficient use of materials, as the skeleton structures 150 and the accessory parts 160 may be cut from the area of the sheet 200 that is not used for the skin 110. In most embodiments, a computer algorithm may place and arrange multiple skins 110, skeleton structures 150, and accessory parts 160 across one or more sheets to increase material use efficiency, which would also reduce waste. In most embodiments, each of the skins 110, the skeleton structures 150, and the accessory parts 160 may be indexed with grooves, notches, and predrilled holes (collectively referenced as 190) to make assembly easier and to reduce errors when assembling the cabinet 100. In most embodiments, the skin 110, the skeleton structures 150, and the accessory parts 160 may be cut to various thicknesses based on the need of a part. In a nonlimiting example, a portion of the skeleton structures 150 may have a thickness sized to receive two inch fasteners, whereas one of the accessory parts 160, such as a drawer, may have a thickness sized to receive one inch fasteners.

In most embodiments, the only cutting tool needed to construct the cabinet 100 may be a CNC (computer numerical controlled) router 300 (not shown). The CNC router 300 may be programmed to make all the necessary cuts, grooves, notches, and predrilled holes (collectively referenced as 190) on the sheet 200 to produce the skin 110, the skeleton structure 150, and the accessory parts 160. The CNC router 300 may also cut each of the skin 110, the skeleton structure 150, and the accessory parts 160 to a desired thickness. In most embodiments, other tools needed to construct the cabinet 100 may be clamps 310, a power drill 320 (not shown), heat lamps 330, fasteners 340, and steam tubes 350 for producing steam 400. In most embodiments, the fasteners 340 may include permanent fasteners and non-permanent fasteners, including but not limited to adhesives, screws, nuts and bolts, welds, clips, friction fits, pins, etc.

In most embodiments, the skeleton structure 150 may be designed so that the fasteners 340 may be hidden from view inside the cabinet 100. In most embodiments, the sheets 200 may be prefinished with high pressure laminate 210 or other finishes (not shown). Thus, when the sheets 200 have been cut, the cabinet 100 may not need to be finished after the cabinet 100 is assembled, which would reduce the time needed to manufacture the cabinet 100. In most embodiments, the laminate 210 may also strengthen the skin 110, the skeleton structure 150, and the accessory parts 160 by adding an extra layer of protection. In most embodiments, once the cabinet 100 has been assembled, a manufacture or user may store or install the cabinet 100 immediately into a structure or vehicle 48 (not shown).

A method for manufacturing a cabinet 100 may start with step 500 as seen with FIG. 5. In most embodiments, the step 500 starts with a sheet 200 that may be cut with a CNC router 300 based on a design of skins 110, skeleton structures 150, and accessory parts 160. In these embodiments, the CNC router 300 may cut the skin 110, the skeleton structures 150, and the accessory parts 160 free from the sheet 200. The CNC router 300 may also cut the skins 110, the skeleton structures 150, and the accessory parts 160 to various thickness depending on the design of the cabinet 100. The CNC router 300 may cut indexes, grooves, notches, predrill holes, etc. (collectively referenced as 190) for identification and assembly. In most embodiments, the CNC router 300 may cut bending grooves 115 in the skin 110 of the sheet 200 that may be used to create curved portions 180. The curved portions 180 may become corners for the cabinet 100. In most embodiments, a radius of the curved portion 180 may depend on a spacing, size, and number of the bending grooves 115 cut into the skins 110.

In the next step 510, all or a portion of the skeleton structures 150 may be assembled by the manufacture or user. In some embodiments, the skeleton structures 150 may be assembled by robotic manipulators (not shown). The skeleton structures 150 may be assembled using fasteners 340 inserted into the predrilled holes or by using the pre-cut grooves and notches. In most embodiments, the assembled skeleton structures 150 may become a fastened skeleton structure 155.

In step 520, the skin 110 may be moved to a table 360 where the clamps 310, the heat lamps 330, the steam tubes 350 may be used to curve or bend the skin 110. In most embodiments, at least one side of the skin 110 may be clamped to the table 360 using the clamps 310. This may allow a user to bend a portion of the skin 110 when one or more bending grooves 115 may been cut into the skin 110.

In step 530, the heat lamps 330 and the steam tubes 350 may be activated so as to heat the laminate 210 and wood 220 of the skin 110. Specifically, the heat lamps 330 may heat the laminate 210 to a forming temperature, and the steam tubes 350 may soften the wood (or other material) with the steam 400. In most embodiments, the heat lamps 330 and the steam tubes 350 may work in conjunction or together. In other embodiments, the heat lamps 330 and the steam tubes 350 may work separately from one another.

In step 540, the fastened skeleton structure 155 may be placed on a heat and/or steam treated portion of the skin 110. In most embodiments, an adhesive may be placed on the fastened skeleton structure 155 that has been placed on the heat and/or steam treated portion of the skin 110. In most embodiments, the skin 110 may bend about the bending grooves 115 with use of the fastened skeleton structure 155 as a guide, thus creating the curved portions 180 of the cabinet 110.

Figure 4:
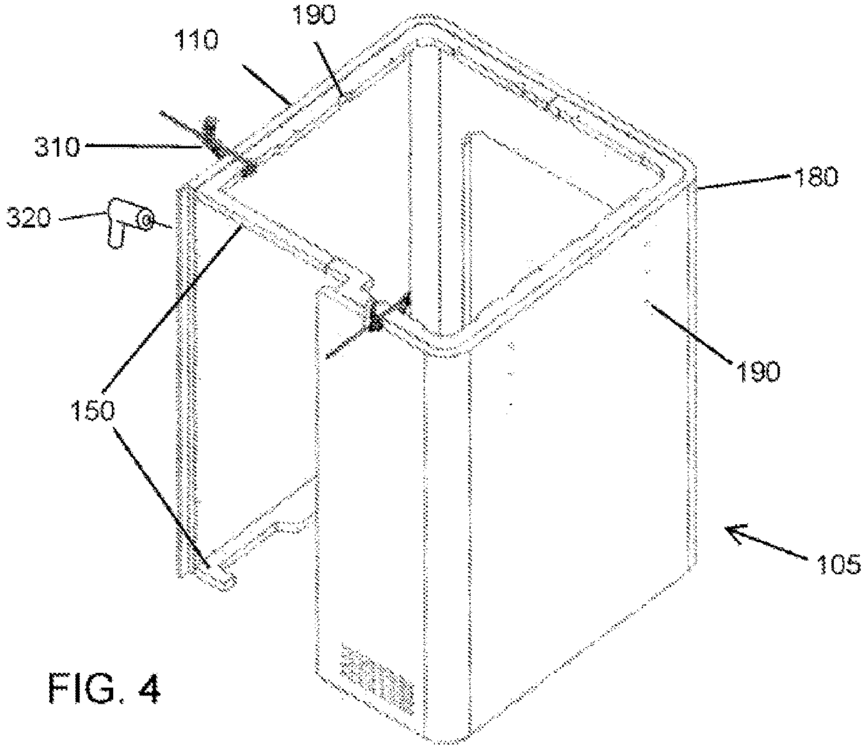
FIG. 4 is an isometric view of a curved skin and a fastened skeleton structure held together by clamps.

In step 550, after the curved portion 180 has been created, the heat lamps 330 may be moved away and the clamps 310 may fasten the skin 110 and the fastened skeleton structure 155 together, so as to maintain the curved portion 180. In most embodiments, the clamps 310 may allow the adhesive to set that may have been applied to the fastened skeleton structure 155 and the skins 110. In most embodiments, the power drill 320 may use the fasteners 340 to permanently connect the skin 110 to the fastened skeleton structure 155. In most embodiments, the CNC router 300 may have pre-drilled apertures or holes on the skeleton structure 150 specifically for the fasteners 340. By placing the pre-drilled apertures or holes on the skeleton structure 150, the fasteners 340 may be hidden from view of the user when that fastener 340 may be inserted into the fastened skeleton structure 155 to connect to the skin 110. In most embodiments, an end result of fastening the skeleton structure 150 to the skin 110 may create an imperfected cabinet 105 as seen in FIG. 4.

In the final step 560, the rest of the skin 110 and the skeleton structures 150 may be assembled into the imperfected cabinet 100. In most embodiments, the accessory parts 160 may be installed or fastened to the imperfected cabinet 105. In most embodiments, the accessory parts 160 may comprise of drawers, doors, countertops, shelves, etc. In most embodiments, when the accessory parts 160 are fastened to the imperfected cabinet 105, a final product, the cabinet 100, may be ready to use for installation and/or storage. This is because the laminate 210 of the cabinet 100 was pre-applied to the sheet 200, the primary material of the cabinet 100, thus saving time and manufacturing costs required for finishing touches, which cost savings may be passed onto the user. Additionally, the cabinet 100 may have curved portions 180 that appear as curved corners or other curved surfaces, thus giving the user a high quality aesthetically pleasing cabinet.

In other embodiments, the above method may be completed using at least one sheet 200 to form at least one set of cabinets 700. In these embodiments, the CNC router 300 may engrave identification markers 290 into the skin 110 and the skeleton structure 150 so as to identify and group the appropriate pieces of each cabinet 700 together for manufacturing.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

The invention claimed is:

1. A method for constructing and assembling a curved cabinet for a vehicle, the method comprising:

using a computer numerical controlled (CNC) router on a sheet of wood;
 wherein the CNC router cuts out
 from the sheet at least one of:
 skins;
 skeleton structures; and
 accessory parts;

fastening with a power drill and a first set of fasteners at least two of the skeleton structures together to create a fastened skeleton structure;

heating with heat lamps and steam tubes at least one of the skins about at least one bend groove;
 wherein the at least one bend groove is cut using the CNC router;

placing the fastened skeleton structure on one of the skins;

bending the one of the skins about the at least one bend groove to conform with the fastened skeleton structure to create a curved portion;

clamping the one of the skins and the fastened skeleton structure together near adjacent the curved portion; wherein the clamped skin and fastened skeleton structure are fastened together with a second set of fasteners to create an imperfected cabinet;

attaching the accessory parts to the imperfected cabinet to create the curved cabinet.

2. The method of claim 1, further comprising applying adhesive to the fastened skeleton structure before placing the fastened skeleton structure on the one of the skins.

3. The method of claim 1, wherein the sheet of wood has at least one side of high pressurized laminate; wherein the heat lamps heat the high pressure laminate to a forming temperature; wherein the steam tubes soften the sheet of wood about the at least one bend groove; wherein the clamping of the skin and the fastened skeleton structure allows for the high pressure laminate and softened wood to harden into the curved portion.

4. The method of claim 3, wherein the CNC router cuts a thickness for each of the skins, the skeleton structure, and the accessory parts.

5. The method of claim 1, wherein the CNC router cuts at least one of indexes, grooves, notches, and predrilled holes into each of the skins, the skeleton structure, and the accessory parts; wherein the at least one of indexes, grooves, notches, and predrilled holes improves assembly of the curved cabinet.

6. The method of claim 1, wherein the CNC router cuts a corner radius based on spacing, size, and number of the at least one bend groove.

* * * * *